United States Patent [19]

Agnelli

[11] Patent Number: 4,600,220
[45] Date of Patent: Jul. 15, 1986

[54] CONNECTION NUT SEAL WITH MEANS FOR ALLOWING TEST OF INTEGRITY

[75] Inventor: Frank J. Agnelli, Denville, N.J.
[73] Assignee: E. J. Brooks Company, Newark, N.J.
[21] Appl. No.: 555,603
[22] Filed: Nov. 28, 1983
[51] Int. Cl.[4] .............................................. F16L 55/00
[52] U.S. Cl. ...................................... 285/80; 285/45; 285/373; 285/419; 285/423; 292/307 B
[58] Field of Search .................. 285/45, 80, 373, 419, 285/423, DIG. 22; 292/307 B

[56] References Cited

U.S. PATENT DOCUMENTS

| 4,372,593 | 2/1983 | Kesselman | 292/307 B |
| 4,405,161 | 9/1983 | Young et al. | 285/45 X |
| 4,422,674 | 12/1983 | Steuernagle | 285/45 X |
| 4,471,982 | 9/1984 | Nielson | 292/307 B |

FOREIGN PATENT DOCUMENTS 2014680  8/1979  United Kingdom ................. 285/80

Primary Examiner—Richard J. Scanlan, Jr.
Attorney, Agent, or Firm—Robert E. Ross

[57] ABSTRACT

A seal for a gas meter coupling nut comprising a ring-shaped housing formed of two separate but identical halves made of relatively brittle molded plastic and having integrally molded fastening means for snapping together the two halves into locking non-removable engagement. The two halves are shaped and dimensioned to be freely, laterally movable a small but appreciable amount relative to each other when locked so that tapping said housing will produce a rattle-like sound thereby indicating that the seal has not been broken open and the halves glued back together.

8 Claims, 8 Drawing Figures

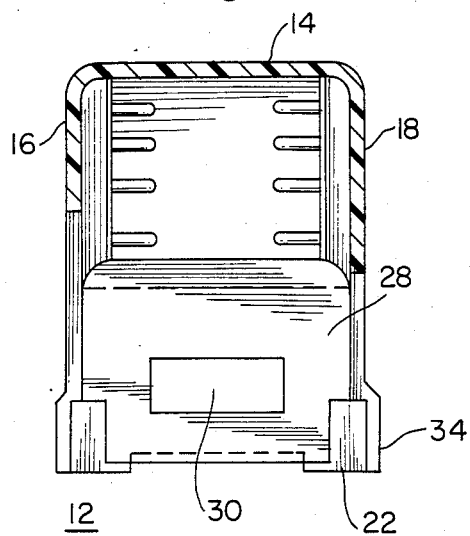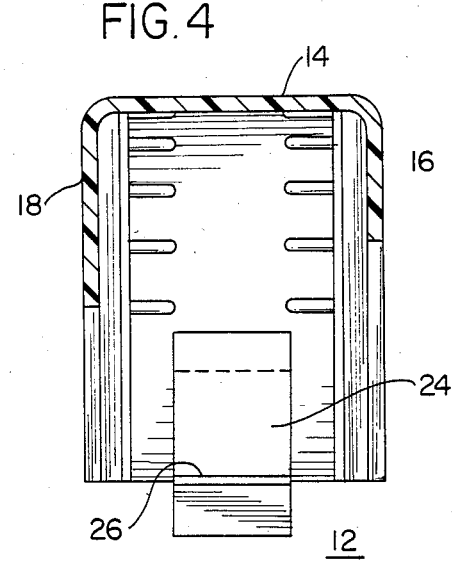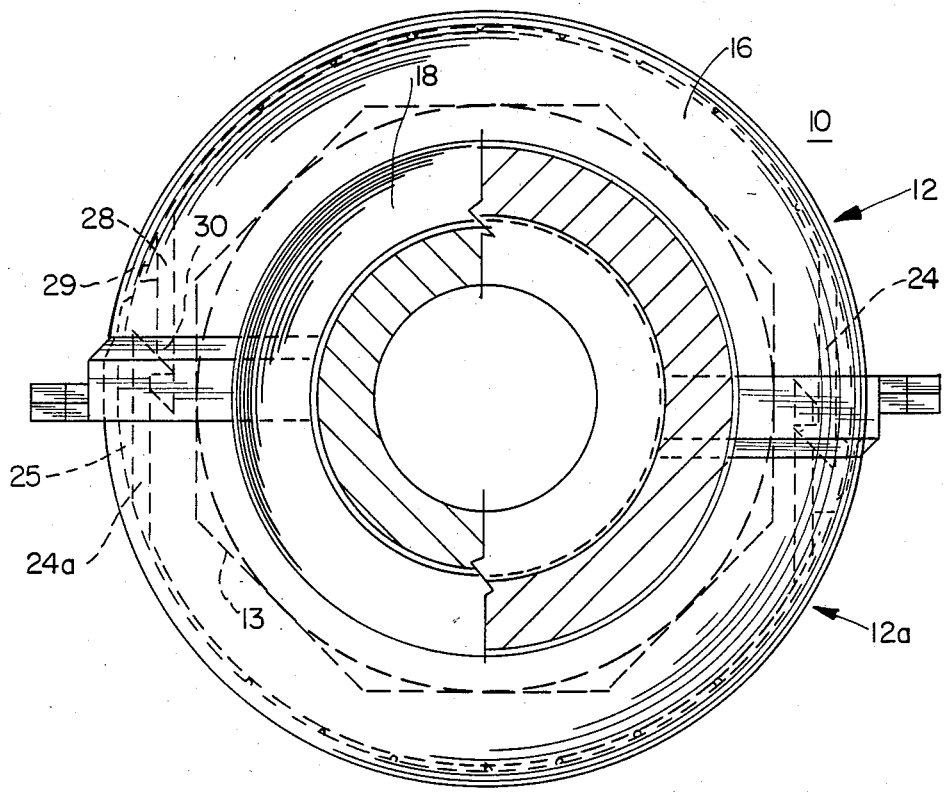

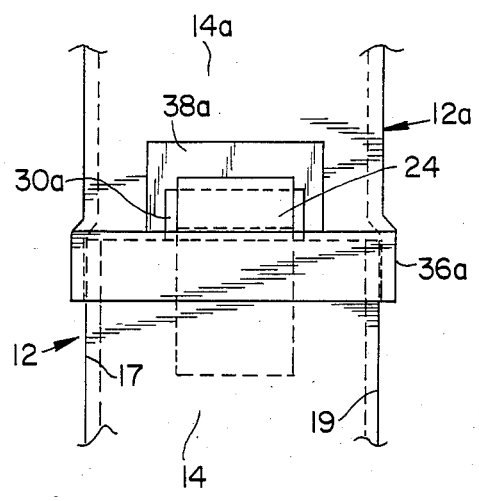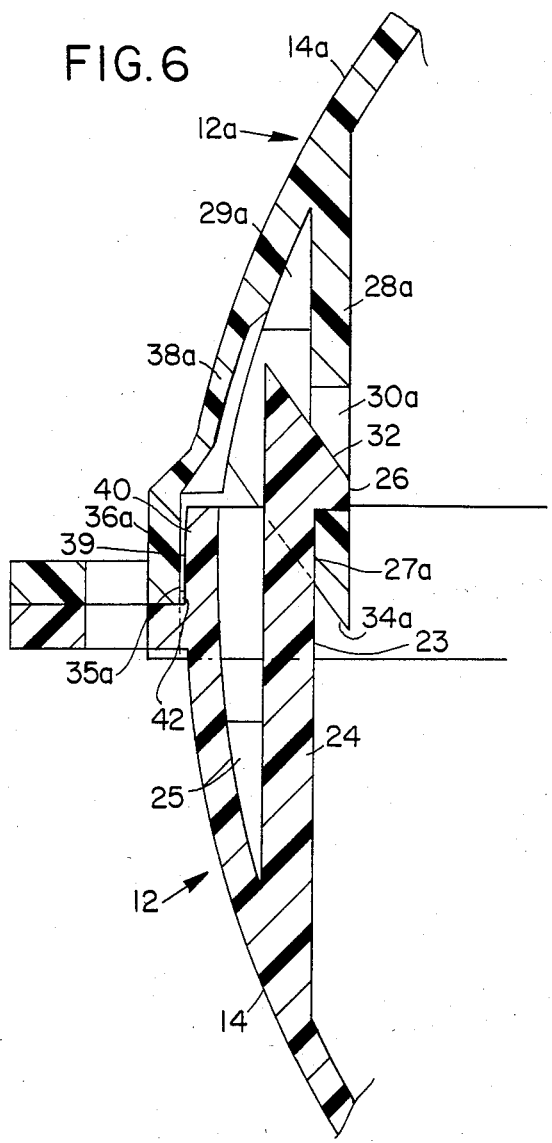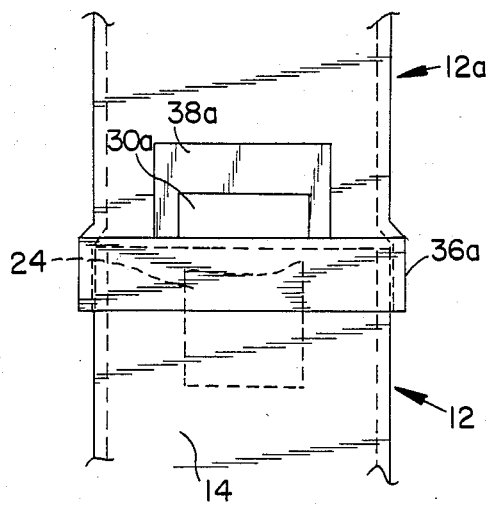

CONNECTION NUT SEAL WITH MEANS FOR ALLOWING TEST OF INTEGRITY

BACKGROUND OF THE INVENTION

In the gas utility industry, it is often required that provision be made to detect attempts to tamper with gas meters, said attempts being either for the purpose of removing the meter to remove a gas blocking plate or to enable the use of gas directly from the supply pipe. For this purpose it has been common to enclose the nut which couples the meter to the supply pipe with a seal in the form of two halves which are fastener together with a lead and wire seal, or else said two halves are provided with means for snapping together in non-removable engagement.

The use of such devices has been limited by the cost thereof, and by the fact that it is often possible to remove such seals and replace them without evidence of tampering. It has also been difficult to detect whether a seal of the type in which the two halves are snapped together has been opened by breaking the fasteners and then gluing the two halves back together.

SUMMARY OF THE INVENTION

A seal for a gas meter coupling nut is formed of a molded plastic of a type which is relatively brittle, with the seal comprising a ring-shaped member which is generally U-shaped in cross-section so as to enable it to enclose a coupling nut. The shell may be formed in two portions connected by a flexible web, or may be formed of two separate but identical halves. In either case integrally molded fastening means is provided within the halves to allow them to be snapped together into locking non-removable engagement.

In a preferred embodiment of the invention the fastening means comprises at least one flexible leg on one portion of the seal which is adapted for snapping engagement with a cooperating member on the other portion, with the flexible leg being positioned behind the outer shell near an end thereof. A viewing window is provided in the outer shell in a position such that at least a portion of the flexible leg is visible through the window. Tampering with the seal usually results in fracturing of the flexible leg, and the absence of the leg can be determined by viewing through the window when the seal is inspected.

In a preferred embodiment of the invention, the components of the housing portions are shaped and dimensioned so that after the two halves have been snapped together, they can be moved laterally in relation to each other manually, thereby indicating that the seal has not been broken open and the two halves then glued back together.

BRIEF DESCRIPTION OF THE FIGURES OF THE DRAWING

FIG. 3 is a view in section taken on line 3—3 of FIG. 1.

FIG. 4 is a view in section taken on line 4—4 of FIG. 1.

FIG. 5 is a top plan view of the seal component of FIG. 1 assembled with an identical component around a connection nut.

FIG. 6 is an enlarged view of one of the locking portions of the seal of FIG. 5.

FIG. 7 is a view of FIG. 6 as seen from the bottom, illustrating the appearance of the viewing window when the locking leg is in place.

FIG. 8 is a view similar to FIG. 7 illustrating the appearance of the viewing window when the locking tab is missing.

DESCRIPTION OF THE ILLUSTRATED EMBODIMENT

Figure 1:
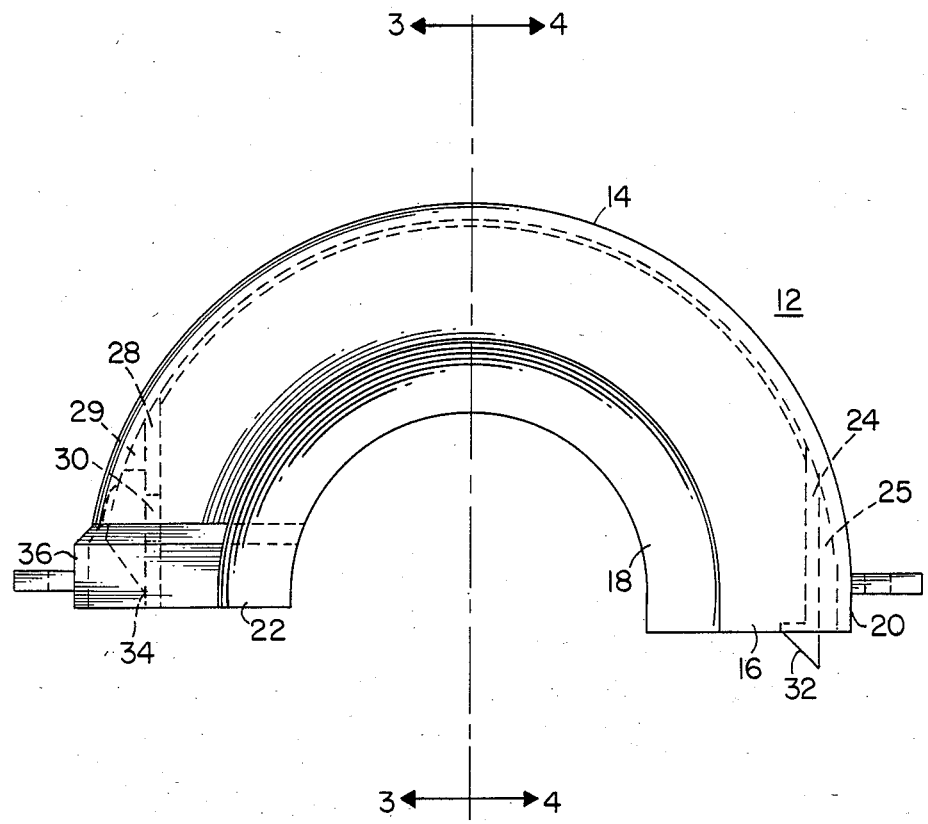
FIG. 1 is a top plan view of one component of a connection nut seal embodying the features of the invention.
Figure 2:
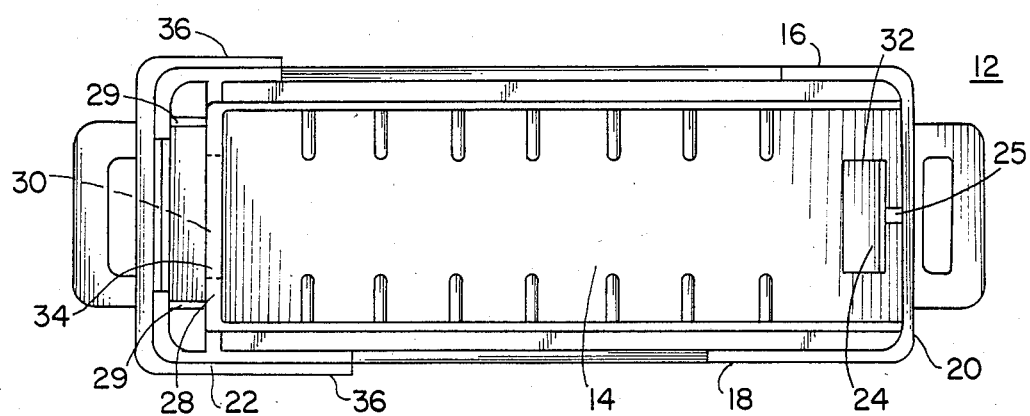
FIG. 2 is a view of the component of FIG. 1 as seen from the bottom.

Referring to the drawing, there is illustrated a connection nut seal 10 which is formed of two identical housing portions 12 and 12a which are preferably formed of a plastic material which is relatively brittle yet has some limited resilience, such as polystyrene.

The housing portions are intended for use in pairs to enclose a coupling nut 13 of a gas meter or the like, and the individual portions are generally semi-circular in plan shape and are U-shaped in cross-section, providing an outer peripheral wall 14 and upper and lower flanges 16 and 18 which extend radially inwardly from the wall.

In the illustrated embodiment the housing portion 12, for example, has an end 20 with a male fastener and an end 22 with a female fastener. The male fastener includes an elongated tongue 24 integral at the rear end with the housing wall 14 and extends forwardly to project from the end 20, with a latch member 26 disposed near the free end thereof. The flexibility of the tongue 24 may be controlled by the provision of an integral web 25 disposed between the rear portion of the tongue and the peripheral wall 14 of the housing. The female portion of the fastener at end 22 comprises a forwardly projecting member 28 which is integral with the wall 14 and has an elongated transverse aperture 30 near the distal end which is positioned to receive a latch member 26a of the housing portion 12a in locking engagement when the two portions 12 and 12a are forced together, as illustrated in FIGS. 5, 6, and 7. To facilitate such engagement the extreme ends 32 and 34 of the tongue 24 and the member 28 are beveled to provide a camming action to cause sideways flexing of one or both of the members 24 and 28 when the housing portions are forced together, so that the latch 26 can ride along the member 28 and snap into engagement with the elongated aperture 30.

In the illustrated embodiment of the invention, the member 28 is relatively rigid, being attached to the peripheral wall by side webs 29, between which the tongue passes when the housing portions are assembled. The extreme forward end of the tongue 24 extends beyond the aperture 30 to minimize the area of the member 28 that could be contacted by a tool inserted through a hole from the outside of the housing.

Although in the illustrated embodiment of the invention, most of the flexing on assembly occurs in the male member 24, it will be understood that if desired, the female member 28 can be made flexible and the tongue rigid. However, in either case, it is desirable that the flexible member be disposed outside of the non-flexible member to prevent release of the members by providing a hole in the housing wall 14 and pushing a tool through the hole to unlatch the members.

To assist in preventing access to the fastener member after assembly of the housing portions, the end 22 has an enlarged portion 36 which is dimensioned to enclose the end 20a of the housing portion 12a when the portions are assembled.

In one embodiment of the invention the seal is made of a plastic which is transparent in a thin section but only translucent or opague in a thicker section, and the entire housing, except for a small portion to be described, has a thickness such that it is not transparent, so that the shape and position of the locking mechanism cannot be determined from the outside of the housing.

Attempts to remove such a seal by an unauthorized person will usually result in the fracture of the tongue 24 or 24a. Although after the seal is opened by fracturing a tongue, the housing portions may be re-assembled by the use of an adhesive, it is difficult if not impossible to adhere the tongue back to its original position.

To allow the absence of a tongue to be detected, a transparent window 38 is provided in the exterior wall 14 at a position opposite the tongue when the seal is assembled. The presence or absence of the tongue may therefore be readily determined by visual examination through the window 38. When the tongue is present, the window is partially blocked by the end of the tongue, (See FIG. 7), however when the tongue is missing, substantially the entire aperture 30 in the member 28 is visible through the window. (See FIG. 8).

In another embodiment of the invention, the housing may be formed of a material which is inherently transparent, and provided with a surface roughness to render it translucent except in the position of the window 38.

It will be noted that the housing and fasteners are so arranged that the "socket" of the fastener is formed (See FIG. 6) by the enlarged portion 36a at the end of the housing wall 14a of the housing portion 12a and the member 28a, and the "stud" of the fastener is formed by the end 40 of the end of the housing wall 14 and the tongue 24 of the housing portion 12. On assembly of the two housing portions, the wall portion 40 and the tongue 24 are flexed together to allow them to pass into the "socket" between the wall portion 36a and the member 28a. A similar action occurs at the other end of the housing portion. The enlarged wall portion 36a is necessarily a part of the fastener for the following reason. If the two housing portions are identical, after assembly the tongue 24 is on the left side of the member 28a, as seen in FIG. 6, and at the other end of the seal, the member 28 is on the left side of the tongue 24a. Therefore if the enlarged portion 36a were removed, the fastener would fall apart, since movement of the portion 12 to the left in relation to the portion 12a would disengage both fasteners.

In a preferred embodiment of the invention, the components of the housing are so shaped and dimensioned that after assembly the distance between the outside surfaces 39 of the wall portion 40 and the inside surface 23 of tongue 24 is less than the distance between the inside surfaces 35a of the enlarged wall portion 36a and the outside surface 27a member 28a. Since the seal is formed of two identical halves, the same relationship occurs at the other end of the housings. Also, the inner surface of the enlarged portion 38a is positioned radially outwardly far enough that there is a space 42 between the outer surface of the end of the wall 14 and the inner surface of the enlarged portion 36a when the lower half is moved to the right in relation to the upper half, as seen in FIG. 6.

The two halves of the seal are therefore capable of a limited amount of lateral movement in relation to each other which can easily be detected manually.

This capability of movement in relation to each other can be utilized to check the seal for integrity. If the two halves move in relation to each other, it indicates the seal is secure, but if they cannot be moved in relation to each other, it indicates that the fasteners of the seal have been broken and the two seal halves glued back together.

In the usual manufacturing procedure, a tolerance is provided between the locking shoulder on the tongue and the edge of the opening 30a into which it is to be engaged. That is, to insure that the locking shoulder can reach the locking position and snap over the edge of the opening when the seal halves are pressed together, the locking shoulder is positioned a slight distance further out on the leg than the exact distance to the slot edge. Therefore after assembly, the two seal halves are capable of a small amount of movement toward and away from each other, in addition to the lateral movement.

Also, as illustrated in FIGS. 7 and 8, the distance between the inner surfaces 17 and 19 of the upper and lower flanges 16 and 18 is slightly less than the distance between the corresponding inner surfaces of the enlarged portion 36a, so that the housing portions are capable of a small amount of vertical movement (i.e., movement to the right and left in FIGS. 7 and 8, and movement out of the plane of the section in FIG. 6) in relation to each other.

This movement, in conjunction with the two types of possible movements previously described, allows another method of checking the seal for integrity, since when the assembled seal is tapped with a pencil or the like, the looseness of the seal portions in relation to each other produces a rattle-like sound if the seal is in its original sealed condition, whereas if the seal has been broken and glued back together, the rattle-like sound will not be produced. This provides a rapid and reliable method of checking the integrity of the seal, which may be done by personnel with no special training in the examination of the seals.

I claim:

1. A seal comprising a housing formed of two portions having means shaped and dimensioned to non-removably fasten said portions together, said means comprising a pair of locking members, one member of the pair being on each housing portion, said means allowing a small but appreciable amount of free lateral movement of the housing portions in relation to each other.

2. A seal as set out in claim 1 in which said housing portions are formed of a relatively brittle plastic, and said means non-removably retaining said housing portions together allow a small amount of free movement of said housing portions toward and away from each other and free movement laterally in relation to each other, whereby when said housing is tapped, it will produce a rattle-like sound.

3. A seal for a pipe coupling or the like, comprising a housing formed in two portions of a brittle plastic, said portions being shaped to closely enclose the nut when assembled together and having cooperating fastener portions for enabling said two portions to be non-removably locked together, said fastener portions being shaped and dimensioned to allow a limited amount of free lateral movement of the portions in relation to each other along the junction of the two portions.

4. A seal as set out in claim 3 in which said portions, after assembly, are capable of free lateral movement relative to each other in two dimensions along the junction of the two portions.

5. A housing portion for non-removable assembly with a similar housing portion to enclose a connection nut or the like, said housing portion being generally semi-circular in plan shape to provide a pair of ends facing in the same direction and being generally U-shaped in cross-section to enclose the connection nut when the ends are attached to the ends of a similar housing portion, said ends having locking fasteners associated therewith to enable the housing portion to be non-removably assembled with a similar portion, one end of said housing portion being sufficiently enlarged to freely receive the other end of a similar housing portion, said enlarged portion having an internal size which is slightly greater than the external size of the other end of a similar housing portion, whereby when the housing portion is assembled with a similar housing portion, the two portions are retained by the enlarged portions against substantial lateral movement in two dimensions in a plane perpendicular to the direction said ends are facing, yet said portions are capable of a limited but appreciable amount of free movement relative to each other in said two dimensions.

6. A housing portion as set out in claim 5 in which said assembled housing portions are formed of a relatively brittle plastic and are capable of a limited amount of free movement toward and away from each other, whereby when said assembled housing portions are tapped, they produce a rattle-like sound due to the looseness between the two portions.

7. A housing portion as set out in claim 5 in which a socket of said fasteners is formed by the enlarged portion at one end of the housing and a relatively rigid member spaced inwardly therefrom, a stud of said fastener portions being formed by the other end of the housing and a relatively flexible member spaced inwardly therefrom, said other end and said relatively flexible member being received between the enlarged portion and the relatively rigid member when the housing portion is assembled with an identical housing portion, said relatively rigid member and said relatively flexible member having means for locking engagement when the two housing portions are assembled together.

8. A housing portion as set out in claim 7 in which said means for locking engagement has sufficient tolerance between the housing portions to allow a small amount of free movement of the assembled housing portions toward and away from each other, whereby when said assembled portions are tapped, they produce a rattle-like sound due to the looseness of the two housing portions in relation to each other.

* * * * *